Oct. 15, 1940. 2,218,265
S. A. NATHAN, NOW BY JUDICIAL CHANGE
OF NAME S. A. NORWOOD
AIR AND VACUUM APPLIANCE FOR AUTOMOBILES AND AUTOMOBILE MOTORS
Filed Jan. 18, 1937 2 Sheets-Sheet 1
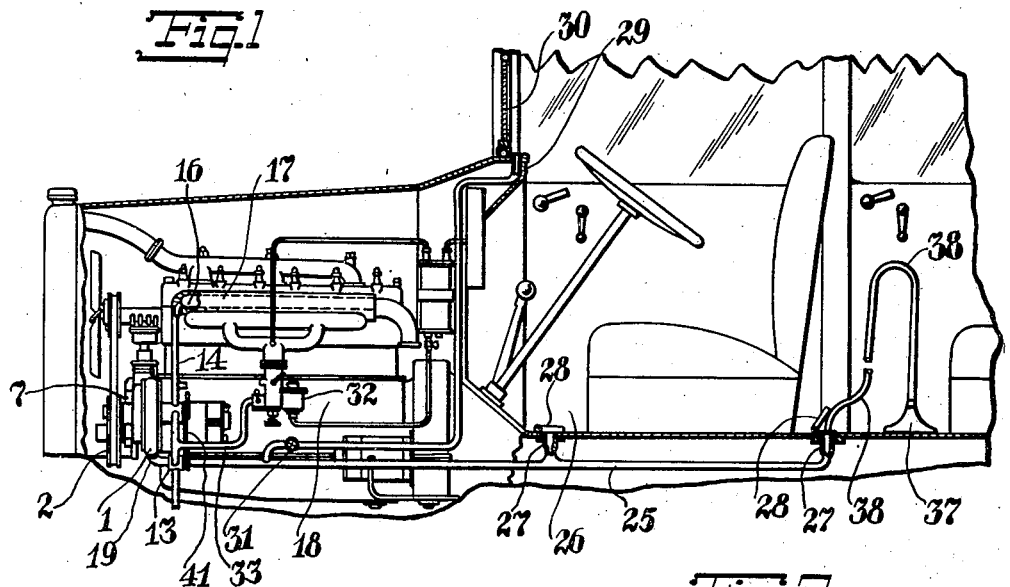
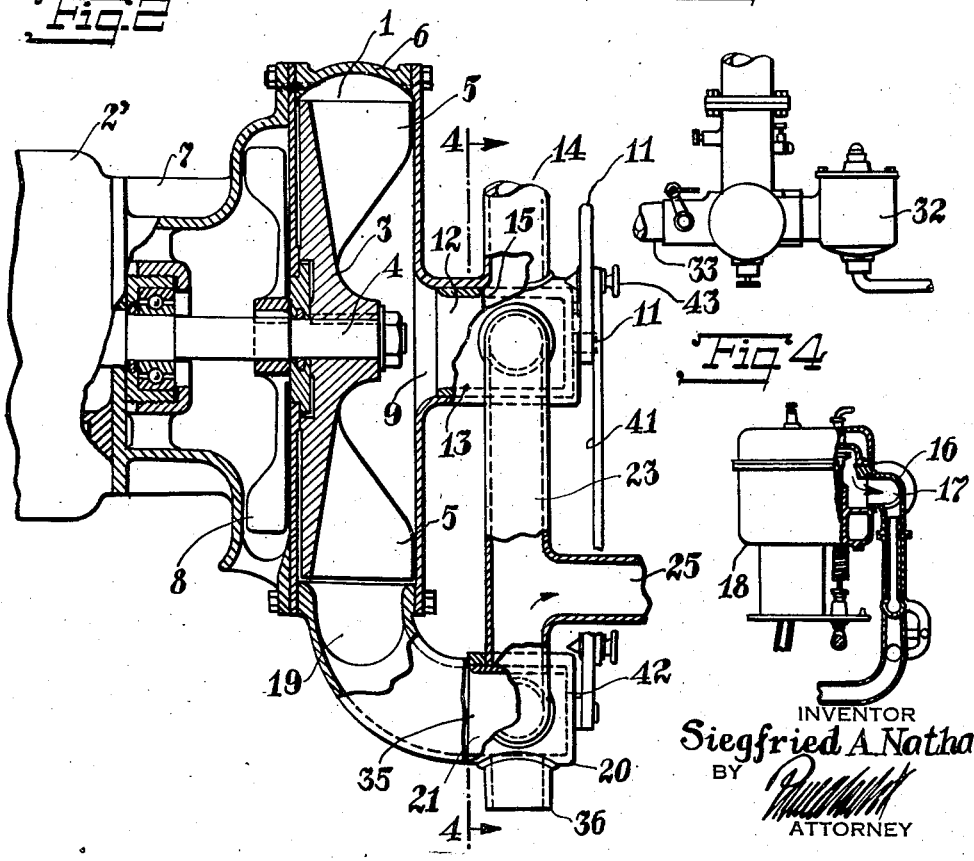
INVENTOR
Siegfried A. Nathan
BY
ATTORNEY Oct. 15, 1940.
S. A. NATHAN, NOW BY JUDICIAL CHANGE
OF NAME S. A. NORWOOD
2,218,265
AIR AND VACUUM APPLIANCE FOR AUTOMOBILES AND AUTOMOBILE MOTORS
Filed Jan. 18, 1937            2 Sheets-Sheet 2
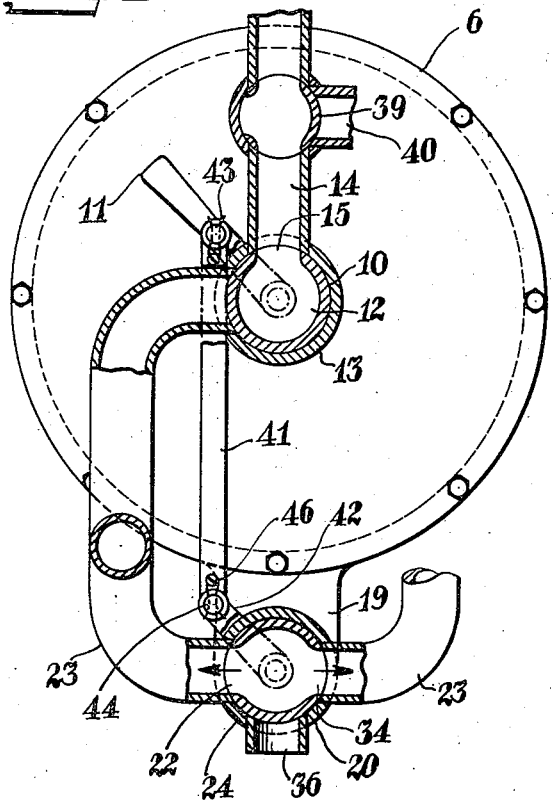
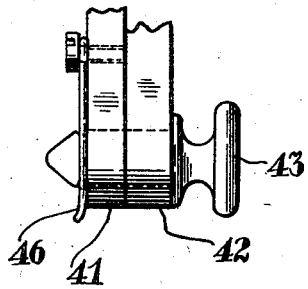
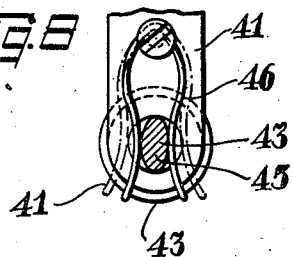
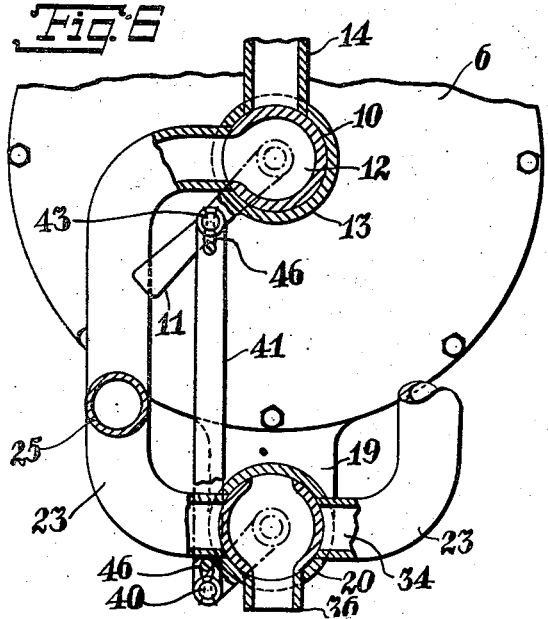
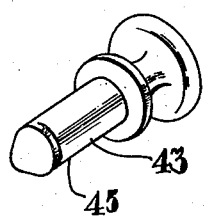
INVENTOR
Siegfried A. Nathan
BY
ATTORNEY Patented Oct. 15, 1940

2,218,265

UNITED STATES PATENT OFFICE 2,218,265

AIR AND VACUUM APPLIANCE FOR AUTOMOBILES AND AUTOMOBILE MOTORS

Siegfried A. Nathan, Long Island City, N. Y., now by judicial change of name S. Albert Norwood, assignor to Nada de Namur Norwood, Jersey City, N. J.

Application January 18, 1937, Serial No. 121,158

10 Claims. (Cl. 237—12.3)

My invention relates to an appliance for handling air for engines and the automobile aeroplanes, boats or other things which may have engines, and has among its objects to provide:

A fan or blower which may be conveniently and quickly connected to supercharge the engine, blow off dust, vacuum clean and heat the car as well as air to carburetor and defrost the windshield or other windows.

A convenient car heating and cleaning device.

A system of conveniently arranged and operated valves to handle low pressure cool or heated air.

A car piping system for air.

A blower which may quickly be adapted to numerous applications of air for cleaning, heating, defrosting and supercharging.

I accomplish these and other objects by the construction herein described and shown in the accompanying drawings in which:

Fig. 1 is a general elevation of a part of an automobile showing the application of my device.

Fig. 2 is a vertical section of the blower and valves.

Fig. 3 is an elevation of the carburetor.

Fig. 4 is a section at 4, Figure 2.

Figures 5 and 6 are fragmentary elevations of the valves and piping system.

Figures 7, 8 and 9 are fragmentary details of the shifting lever pins.

Similar reference characters refer to similar parts throughout the several views and in the following specifications.

I am aware that there are blowers for supercharging internal combustion engines, vacuum cleaners and hot air heaters in which a fan circulates the heated air, and it is not my purpose to add to the efficiency of any of these well known devices, but to provide a means of utilizing them in a compact and convenient manner suited to places where the bulky systems would be impractical. My blower valves and piping make an increased use of these labor saving, convenient and meritorious devices.

I have herein shown my preferred form which may be modified to suit varying conditions such as the arrangements of the parts of the motor and its use as in a car, plane, or boat, etc. The fan or blower 1, is so driven by the fan belt 2 as shown in Figure 1, or directly connected to the generator or motor 2 as shown in Figure 2, where the blower rotor 3 is mounted on the armature shaft 4. The rotor and its blades 5 are mounted in the blower housing 6, secured to the generator 2' by the framework 7, which may be provided with the cooling fan 8, for cooling the parts of the generator.

The suction inlet 9 is provided with the barrel valve 10, operated by the lever 11, and is open at its inner end 12. The valve 10 revolves in its casing 13, to which the intake heater, pipe 14 is secured and connects with the port 15 of said valve when it is desired to pass heated air through said pipe 14 from the stove 16 around the exhaust manifold or pipe 17 of the engine 18 to the blower 1.

The blower delivers the heated air through its discharge outlet 19 to the discharge valve 20, which is open at its inner end 21 to communicate with the discharge outlet 19. The valve 20 is provided with the port 22 which communicates with the bypass pipe 23 which is connected to the housing 24 on which said valve 20 rotates.

The bypass pipe is provided with the pipe 25 which connects said blower 1 with the interior of the car 26 where several outlets 27 are provided to deliver heated air for heating the car.

The outlets 27 at ends of said pipe 25 are provided with the swinging valve caps 28 permitting the discharge of air under pressure but acting as a check valve to prevent a reverse flow of air from entering said pipe.

A branch line 29 is connected to said pipe 25 suitable to deliver heated air to defrost the windshield 30, and has a check valve 31 to prevent air from being drawn into and through said line 29 and pipe 25.

Heated air is also provided the carburetor 32 through the pipe or duct 33, which is connected to the discharge valve housing 24 and the port 34.

Thus heated air under pressure may be discharged from the blower 1 and stove 16 to heat the car interior, to defrost the windshield and to supercharge the engine 18 through its carburetor 32.

A movement of the valves 10 and 20 approximately 90 degrees, causes the port 15 to connect the bypass pipe 23 with the blower intake or suction inlet 9, thus changing the flow from heated air under pressure to cold air under a vacuum in the pipe 25 and the ports 22 and 34 of the discharge valve housing 24 are closed while the port 35 is open to the discharge outlet 19 of the blower 1.

The port 35 connects to the discharge nozzle 36, permitting dirt and air from the vacuum cleaning nozzle 37 to escape therethrough.

The vacuum cleaner is preferably attached by its flexible hose 38 to the outlets 27 in the usual manner with vacuum systems.

When it is desired to blow cold air through the pipe 25, the pipe 14 may be provided with a valve 39 suitable to shut off the air from the stove and open the cold air inlet 40.

The valves 10 and 20 are preferably operated simultaneously by means of the detachable link 14 connecting the lever 11 and the lever 42 of the valve 20. The link 41 is preferably provided with the pins 43 and 44 at each end which are provided with the side grooves 45 adapted to receive the hairpin springs 46. A 90 degree turn of said pins forces said springs out of their notches, permitting the free withdrawal of the pins and the link.

Upon removal of the link 41, each of the levers 11 and 42 may be operated independently.

For the purpose of simplicity and clarity, I have shown and described but one of the various constructions herein and I may wish to depart from these details as my device may be modified to suit its various uses and applications within the scope of the appended claims which succinctly set forth my invention.

I claim:

1. In a blower system for automobiles having a motor driven blower, an air inlet to said blower and air heating means heated by the motor exhaust, and connecting pipes from said air heating means to the inlet to said blower, a carburettor, combined pressure and vacuum connections in said automobile and pipes connecting said carburetor and said pressure and vacuum connections to said blower, a by-pass pipe connected to the inlet and outlet of said blower and valves in said connecting pipes and said by-pass pipe movable to change the direction of air to and from said blower in said connecting pipes to said combined pressure and vacuum connections in said car whereby the car may be heated when said valves are in one position and cleaned of dirt when said valves are moved to another position.

2. In a motor car heating and cleaning system, a blower having an inlet and outlet, combined pressure outlet and vacuum inlet connections in said car, a by-pass pipe, and valves in the inlet and outlet of said blower in said by-pass, said by-pass connecting said inlet to said outlet to said blower and a pipe connecting said combined pressure outlet and vacuum inlet to said blower and by-pass, heating means heated by the exhaust gases of the motor of said car and a pipe connecting said heating means to said blower and by-pass, said valves operable to provide heated air to said car from said blower and heating means when set in one position and to discharge dirt ladened air from said combined connections in the car through said blower to the atmosphere when said valves are set in another position.

3. In pneumatic systems for motor cars, a blower having an inlet port and a valve in said inlet port, a discharge port to said blower and a valve in said discharge port, a by-pass pipe connecting said inlet and discharge valves, said valves operable to connect said by-pass pipe when set in one position to the inlet port of said blower and when set in another position to the discharge port of said blower, a pipe connected to said by-pass pipe and combined inlet and discharge connections in said car connected to said pipe and a carburettor for the motor of said car and a pipe connecting said carburettor to said blower whereby air under pressure may be supplied to said carburettor under pressure and simultaneously to said combined connection in said car.

4. In pneumatic systems for motor cars, a blower having an inlet port and a valve in said inlet port, a discharge port to said blower and a valve in said discharge port, a by-pass pipe connecting said inlet and discharge valves, said valves operable to connect said by-pass pipe when set in one position to the inlet port of said blower and when set in another position to the discharge port of said blower, a pipe connected to said by-pass pipe and combined inlet and discharge connections in said car connected to said pipe and a carburettor for the motor of said car and a pipe connecting said carburettor to said blower whereby air under pressure may be supplied to said carburettor under pressure and simultaneously to said combined connection in said car, a heater heated by the exhaust gases from the motor of said car and a pipe connecting the inlet port of said blower to said pipe whereby heated air may be supplied to said carburettor and to said connections in the car to heat the car.

5. In pneumatic systems for motor cars, a blower having an inlet port and a valve in said inlet port, a discharge port to said blower and a valve in said discharge port, a by-pass pipe connecting said inlet and discharge valves, said valves operable to connect said by-pass pipe when set in one position to the inlet port of said blower and when set in another position to the discharge port of said blower a pipe connected to said by-pass pipe and combined inlet and discharge connections in said car connected to said pipe and a carburettor for the motor of said car and a pipe connecting said carburettor to said blower whereby air under pressure may be supplied to said carburettor under pressure and simultaneously to said combined connection in said car, a heater heated by the exhaust gases from the motor of said car and a pipe connecting the inlet port of said blower to said pipe whereby heated air may be supplied to said carburettor and to said connections in the car to heat the car, a windshield for said motor car and a pipe connected to the discharge port of said blower to supply heated air to said windshield to heat and defrost said windshield.

6. In pneumatic systems for motor cars, a blower having an inlet port and a valve to said inlet port, a discharge port to said blower and a valve in said discharge port, a by-pass pipe connecting said inlet and discharge valves, said valves operable to connect said by-pass pipe when set in one position to the inlet port of said blower and when set in another position to the discharge port of said blower a pipe connected to said by-pass pipe and combined inlet and discharge connections in said car connected to said pipe and a carburettor for the motor of said car and a pipe connecting said carburettor to said blower whereby air under pressure may be supplied to said carburettor under pressure and simultaneously to said combined connection in said car, and a flexible hose and nozzle attachable to said combined inlet and discharge connections in said car to clean the interior of said car when said valves are set to connect the inlet of said blower to said connections.

7. In a car heating and cleaning system, a motor and heating means heated by the exhaust gases of said motor, a blower connected to said heating means to draw heated air to said blower, and a discharge pipe from said blower and means connected to said discharge pipe in said car whereby heated air may be delivered to the car and means reversing the flow of air in said pipe, a windshield for said car and a pipe connected to said discharge pipe to deliver heated air to said windshield for defrosting said windshield and a valve in said pipe to said windshield to prevent air from flowing in a reverse direction in said pipe from said windshield.

8. In a car heating and cleaning system, a motor and heating means heated by the exhaust gases of said motor, a blower connected to said heating means to draw heated air to said blower, and a discharge pipe from said blower and means connected to said discharge pipe in said car whereby heated air may be delivered to the car, and means connecting said discharge pipe to the inlet of said blower and disconnecting said heater from said inlet whereby a partial vacuum may be supplied to said connecting means in said car to permit said car to be cleaned and to discharge the dirt ladened air therefrom through said blower to the atmosphere.

9. In a blower system for motor cars having a motor driven blower, an exhaust heater, a carburetor and combined inlet and outlet connections in said car, and pipes connecting said blower to said heater, carburetor and combined inlet and outlet connection in said car and a by-pass conduit connected across the inlet and outlet of said blower and to said pipes and valves in said by-pass conduit and said heater and carburetor pipes constructed and arranged to discharge heated air under pressure to said combined inlet and outlet connections through one of said pipes into said car when in one position to heat said car and to reverse the flow of air to said inlet of said blower when in another position.

10. In a blower system for motor cars having a motor driven blower, an exhaust heater, a carburetor and combined inlet and outlet connections in the car, and pipes connecting said blower to said heater, carburetor and combined inlet and outlet connections in said car and a by-pass conduit connected across the inlet and outlet of said blower and to said pipes, and valves in said by-pass conduit constructed and arranged to discharge heated air under pressure to said combined inlet and outlet connections in said car when in one position to heat said car and supply heated air to said carburetor, said valves and pipes being so connected as to prevent dirt from said combined inlet and outlet connections in said car from entering the carburetor when the flow of air is reversed by the movement of said valves.

SIEGFRIED A. NATHAN.